United States Patent
Ohnuki et al.

[11] Patent Number: 6,160,769
[45] Date of Patent: *Dec. 12, 2000

[54] OPTICAL RECORDING MEDIUM AND OPTICAL RECORDING DEVICE

[75] Inventors: Satoru Ohnuki, Toride; Toshinori Sugiyama, Tsukuba; Masafumi Yoshihiro, Kitasouma-gun; Tsuyoshi Maro, Otokuni-gun, all of Japan

[73] Assignee: Hitachi Maxell, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/131,226

[22] Filed: Aug. 7, 1998

[30] Foreign Application Priority Data

Aug. 7, 1997 [JP] Japan ................. 9-225760
Aug. 27, 1997 [JP] Japan ................. 9-244844

[51] Int. Cl.⁷ ............... G11B 11/00; G11B 7/24
[52] U.S. Cl. ............ 369/13; 369/275.5; 428/694 DE
[58] Field of Search .................. 369/13, 275.5, 369/275.4, 275.1, 288, 100, 110, 112, 44.21, 44.22; 428/694 ML, 694 DE, 694 TP, 694 TC, 323, 327, 328, 329, 330, 331; 360/114, 59, 102, 103, 105

[56] References Cited

U.S. PATENT DOCUMENTS 5,197,050  3/1993  Murakami et al. .......... 369/13
5,202,880  4/1993  Lee et al. ................. 369/275.4
5,353,278  10/1994 Murakami et al. .......... 369/290
5,463,609  10/1995 Inagaki et al. ............. 369/112
5,618,617  4/1997  Uchida et al. ............. 428/323

OTHER PUBLICATIONS

Yoshito Tsunoda, "Foundation and Application of Optical Disk Storage", Incorporated Association of Society of Electronics Information and Communication, p. 65, (1995).
Nikkei Electronics, No. 686, pp. 13–14, (Apr. 7, 1997).

*Primary Examiner*—Ali Neyzari
*Attorney, Agent, or Firm*—Birch, Stewart, Kolasch & Birch LLP

[57] ABSTRACT

A magneto-optical recording medium comprises a protective layer having a self-lubricating property formed at an uppermost layer on a side opposite to a substrate wherein a recording or reproducing light beam comes into a side of the protective layer. The thickness and the refractive index of the protective layer are selected under predetermined conditions depending on whether or not evanescent light is transmitted through the protective layer. It is possible to perform high density recording and reproduction thereof by utilizing the evanescent light. A protective layer having a self-lubricating property may be also formed on a bottom surface of an optical head opposing to the optical recording medium. Even when the optical head contacts with the surface of the optical recording medium, the sliding scratch scarcely occurs, because the optical head smoothly glides on the recording medium surface. It is possible to reduce the influence of multiple interference of light which would be otherwise caused in an air layer existing between the optical recording medium and the optical head, and it is possible to suppress variation in reproduced signal intensity.

10 Claims, 10 Drawing Sheets

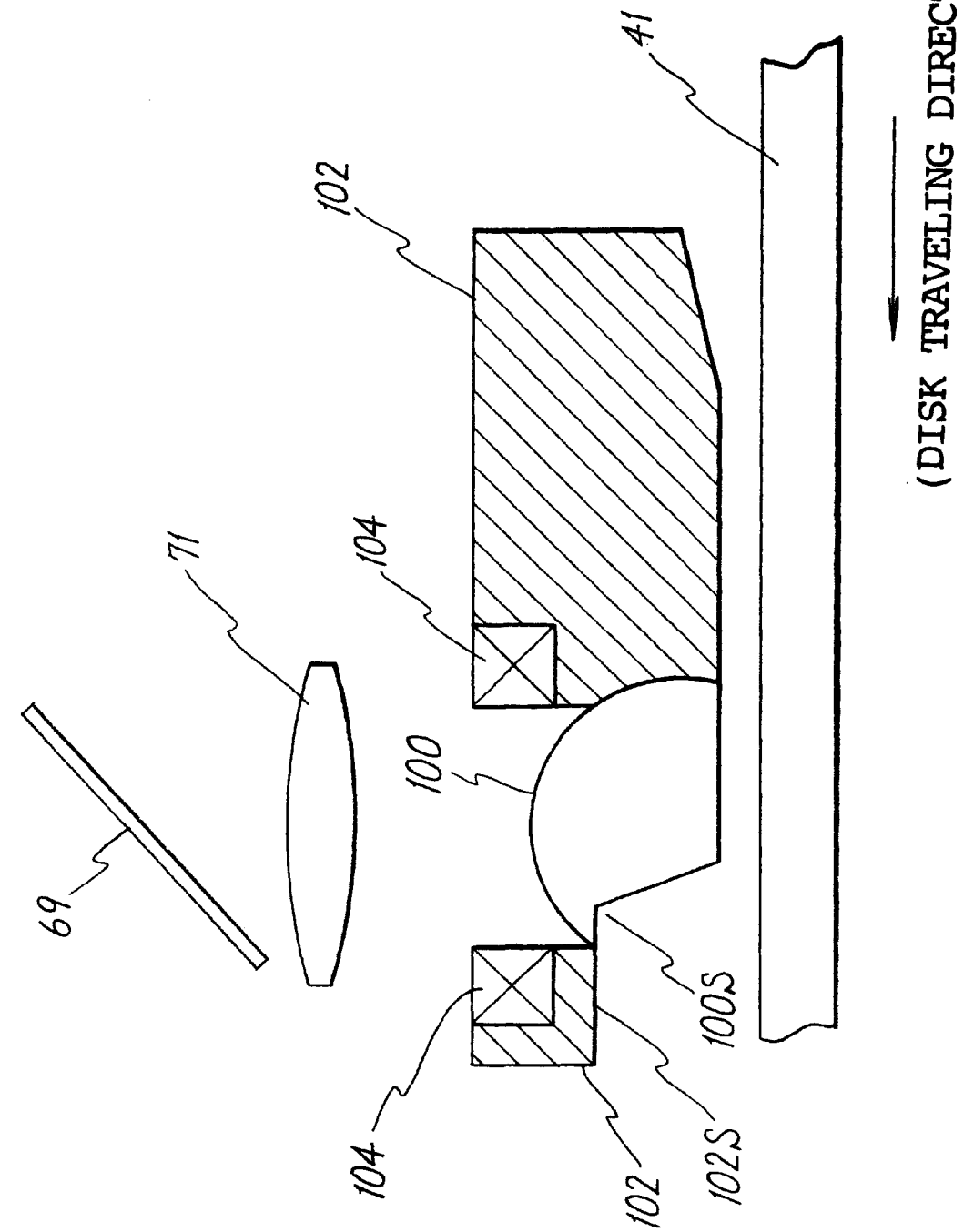

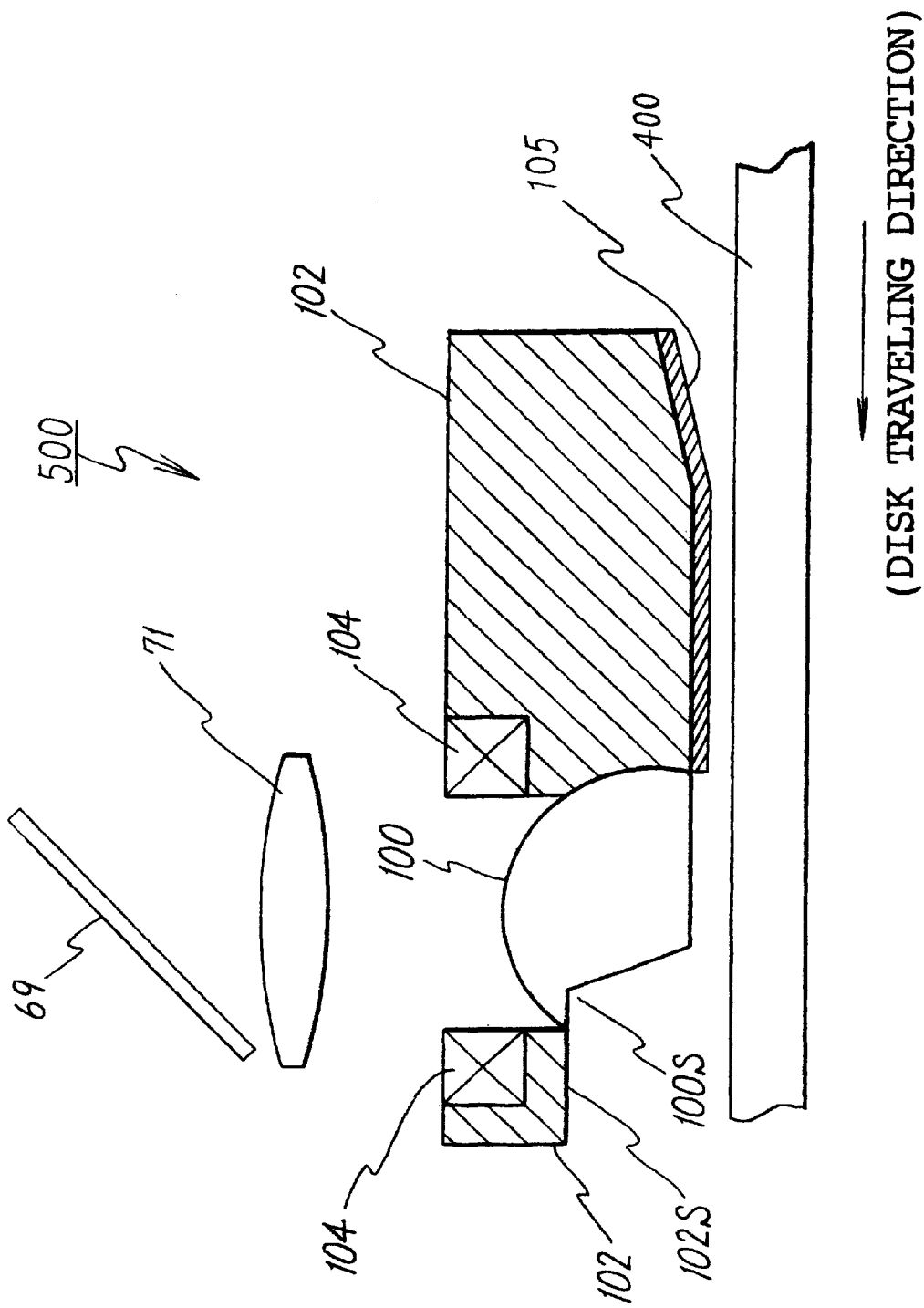

CROSS-SECTIONAL VIEW OF
SLIDER TAKEN ALONG 6A-6A

SIDE VIEW OF SLIDER

BOTTOM VIEW OF SLIDER

OPTICAL RECORDING MEDIUM AND OPTICAL RECORDING DEVICE

BACKGROUND OF THE INVENTION

1. Field of the Invention

The present invention relates to an optical recording medium on which recording and reproduction are performed by using an optical head which carries a solid immersion lens. In particular, the present invention especially relates to an optical recording medium and an optical recording apparatus for the same which improve the durable performance for sliding movement effected between an optical head which carries a solid immersion lens and the optical recording medium, making it possible to record information at a high density by utilizing evanescent light, and reproduce the recorded information with high C/N.

2. Description of Related Art

Recently, the optical recording apparatus, which is an information-recording apparatus capable of recording a large capacity of data at a high density and quickly reproducing recorded data, is used in response to the development of the information-recording apparatus to conform to the multimedia. The optical recording medium, which is subjected to recording or reproduction by using the optical recording apparatus, includes the read-only disk such as CD and laser disks in which information is permanently stored by stamping the disk surface to have a concave-convex configuration upon production of the disk, the write-once type disk such as CD-R which are capable of recording only once, and the rewritable type disk in which data can be rewritten and erased any number of times by using the magneto-optical recording system or the phase-change recording system. When the information is recorded or reproduced on the optical recording medium by using the optical recording apparatus, a light spot is used, which is obtained by focusing a laser beam up to the diffraction limit by using a lens. The size d of the light spot is represented by $d=\lambda/NA$ provided that the wavelength of the laser is $\lambda$, and the numerical aperture of the lens is NA ("Foundation and Application of Optical Disk Storage", edited by Yoshito Tsunoda, Incorporated Association of Society of Electronic Information and Communication (1995), p. 65).

In order to record information on the optical recording medium at a higher density, it is necessary to decrease the recording laser spot size so that minute pits and magnetic marks are formed. However, according to the expression described above, in order to decrease the light spot, the laser wavelength ($\lambda$) may be decreased, or the numerical aperture (NA) of the lens is increased. The semiconductor laser for performing reproduction on the optical disk used at present has the wavelength which is mainly 780 to 680 nm. A laser of orange color of 650 nm, which is shorter in wavelength than the above, begins to be used, for example, for the digital versatile disk (DVD-ROM). However, the short wavelength laser, which emits green or blue light of a wavelength shorter than the wavelength of the orange laser, is still under development. There is a limit to decrease the spot size by decreasing the laser wavelength.

On the other hand, as shown in FIG. 1, the numerical aperture (NA) of the lens is represented by $NA=\sin\phi$ provided that the focusing half angle of the lens is $\phi$. The numerical aperture NA has a value smaller than 1. The lens, which is used at present, has NA of about 0.5. Even if NA=0.9, which approximates to the theoretical limit, is achieved, the laser spot size can be merely reduced to be $1/1.8$ at most. On the other hand, if NA is increased, then the depth of focus of the lens system becomes shallow, and a problem arises in that a complicated control system should be used to maintain the focal point on the recording plane. Therefore, it is impossible to excessively increase NA. In the case of an ordinary optical recording apparatus, a lens approximately having NA=0.6 is used at the maximum.

A method for effectively increasing NA of the lens has been suggested, in which a solid immersion lens is used in order to decrease the spot size of the laser beam (Nikkei Electronics, No. 686, pp. 13–14, 1997.4.7). As shown in FIG. 2A, when a hemispherical solid immersion lens is used, and the laser beam is allowed to come perpendicularly into the lens surface, then the equivalent NA of the optical system is represented by $n \times NA$ provided that the refractive index of the solid immersion lens is n. As shown in FIG. 2B, when a super spherical solid immersion lens is used, and the laser beam is allowed to come so that the focal point is formed on the bottom surface of the super spherical lens, then the equivalent NA is represented by $n^2 \times NA$. When the solid immersion lens is made of glass, the refractive index of glass is about 1.8. Therefore, the spot size can be decreased to be $1/1.8$ when the hemispherical solid immersion lens is used, and the spot size can be decreased to be $1/3.2$ when the super spherical solid immersion lens is used, respectively as compared with the case in which an ordinary objective lens is used.

When the solid immersion lens is used, the evanescent light, which leaks out from the solid immersion lens, can be used to perform recording and reproduction. The attenuation distance of the evanescent light is not more than the wavelength of the light emitted from the light source. Therefore, it is necessary to allow the solid immersion lens to approach the medium so that the solid immersion lens is disposed within the attenuation distance of the evanescent light. For this reason, when the solid immersion lens and the evanescent light are used in combination, it is necessary to use a flying type slider as used for a magnetic head of a fixed type magnetic disk (hard disk). FIG. 3 shows an example of the structure of the optical head for the magneto-optical recording medium based on the use of such a flying type slider. The optical head comprises an objective lens 71, a solid immersion lens 100, and a recording magnetic field-generating coil 104 incorporated into a flying type slider 102.

In the case of an ordinary magneto-optical recording apparatus, the light is radiated onto the recording layer through a transparent substrate of the magneto-optical recording medium. However, in the case of the optical head based on the use of the solid immersion lens, the spacing distance between the solid immersion lens and the optical recording medium is restricted as described above. Therefore, the magneto-optical recording medium adopts a structure in which a reflective layer, a second dielectric layer, a magneto-optical recording layer, and a first dielectric layer are stacked in this order on a substrate. It is necessary for the magneto-optical recording medium to be irradiated with the recording and reproducing light beam from the side opposite to the substrate, i.e., from the side of the first dielectric layer. For example, U.S. Pat. No. 5,202,880 discloses an optical recording medium and a recording and reproducing apparatus of the type in which the recording and reproducing light beam comes from the side opposite to the substrate.

In the case of the ordinary optical disk, in order to protect the recording layer, a protective layer is formed on the side of the recording layer surface opposite to the substrate by applying ultraviolet-curable resin or Si resin curable in the atmospheric air. The protective layer generally has a thickness of several μm to several tens of μm. In the case of the system based on the use of the evanescent light by the aid of the solid immersion lens, it is impossible to form the protective layer made of resin on the second dielectric layer, because the protective layer made of resin is thicker than the attenuation distance of the evanescent light. Therefore, in this system, the recording and reproducing optical head is moved at a position separated by about 100 nm from the first dielectric layer as the uppermost layer, in the same manner as in the fixed type magnetic disk apparatus. For this reason, if the optical head varies its flying posture during the movement, then the optical head contacts with the second dielectric layer, and its surface is scratched in some cases.

The first dielectric layer, which is disposed at the uppermost layer of the magneto-optical recording medium, is formed of a hard material such as silicon nitride, silicon oxide, aluminum nitride, and silicon carbide. The film thickness thereof is 50 to 100 nm which is two to five times thicker than that used in the magnetic disk. The flying height of the recording and reproducing optical head can be 100 to 150 nm which is about two to three times higher than that used in the magnetic disk, when the evanescent light is used by the aid of the solid immersion lens. Therefore, the scratch, which is formed on the surface of the dielectric layer due to irregular sliding movement caused by variation of the posture of the optical head, does not become so deep to arrive at the recording layer. In many cases, the scratch is formed in the traveling direction of the optical head, as a grazed stripe-shaped scratch having a width of about several μm to several hundreds of μm and a depth of about several tens nm. In the case of the optical disk such as an ordinary magneto-optical disk, the laser spot size is about 1 mm at the minimum on the surface of the substrate, because the reproduction is performed through the transparent substrate. Therefore, the scratch of about several μm to several tens of μm formed on the substrate surface scarcely causes problems concerning recording and reproduction. However, the system, which is based on the use of the evanescent light by the aid of the solid immersion lens, utilizes the leakage of the laser beam having been focused up to the diffraction limit. Therefore, a problem arises in that the scratch, which merely has a width of several μm formed on the surface of the dielectric layer, tends to cause any reproduction error due to variation of the amount of reflected light, i.e., the amount of reproducing light, caused by the interference at the edge of the scratch.

Further, there has been also a problem that when recording or reproduction is performed by means of the evanescent light by using the solid immersion lens, then the structure of the optical recording medium should be properly adjusted, and the positional relationship between the solid immersion lens and the optical recording medium should be properly adjusted in accordance therewith, because the attenuation distance of the evanescent light is extremely short as described above.

Moreover, if there is any irregularity on the surface of the optical recording medium, the flying height of the optical head supported by the flying type slider varies depending thereon. However, if the flying height of the optical head varies, any multiple interference of light may occur depending on the flying amount, in the air layer intervening between the surface of the optical recording medium and the light-emitting plane of the optical element installed to the optical head. If such interference is caused, the intensity of reflected light changes. The change in intensity of reflected light causes variation in reproduced signal output from the optical recording medium, possibly resulting in reproduction error.

SUMMARY OF THE INVENTION

The present invention has been made in order to dissolve the problems of the conventional technique described above, an object of which is to provide an optical recording medium in which the scratch is hardly formed on the recording medium surface due to collision between the optical head and the recording medium, and even if any scratch is formed on the medium surface, the scratch is in a degree not to cause any error during reproduction.

Another object of the present invention is to provide an optical recording medium in which the structure of the medium and the positional relationship between a solid immersion lens and the medium are properly adjusted in order to appropriately perform recording or reproduction of information by utilizing the evanescent light.

Still another object of the present invention is to provide an optical recording medium which makes it possible to suppress variation in reproduced signal intensity resulting from any influence of interference of light caused in a light-transmissive medium existing between the optical recording medium and an optical head.

Still another object of the present invention is to provide an optical recording apparatus in which an optical system is property adjusted in conformity with the optical recording medium in order to appropriately perform recording or reproduction by utilizing the evanescent light.

According to a first aspect of the present invention, there is provided an optical recording medium comprising, on a substrate, at least a reflective layer, a recording layer, and a dielectric layer, wherein:

a solid protective layer having a self-lubricating property is formed on the dielectric layer; and evanescent light is allowed to come into a side of the solid protective layer having the self-lubricating property by using an optical head including a solid immersion lens carried thereon so that at least one of recording and reproduction of information is performed.

The optical recording medium of the present invention may have the structure comprising at least the reflective layer, the recording layer, and the dielectric layer on the substrate. The solid protective layer having the self-lubricating property is stacked on the dielectric layer which is opposed to the optical head. Accordingly, even if the flying position of the optical head is varied, and the optical head slides on the surface of the optical recording medium, then the optical head smoothly glides on the surface of the recording medium. Accordingly, the optical head is not caught on the surface, and the sliding scratch hardly occurs. The protective layer having the self-lubricating property tends to be peeled off in a layered manner. Therefore, even when the optical head intensely collides with (slides on) the recording medium, the protective layer is firstly peeled off in the layered manner. Thus, the optical head and the dielectric layer are prevented from occurrence of sharp scratches. Therefore, it is possible to suppress the error and the defect of the reproduced signal which would be otherwise caused by the scratch formed on the surface on the side of being irradiated with the reproducing light beam on the optical recording medium.

In the present invention, the term "having a self-lubricating property" means the fact that the material itself has the lubricating property by itself, for example, as in graphite and molybdenum disulfide. Those usable as the substance for forming the protective layer having the self-lubricating property formed on the optical recording medium according to the present invention include, for example, carbon film, inorganic substances such as molybdenum disulfide, lead oxide, cadmium oxide, and boron oxide, and high molecular weight compounds such as polytetrafluoroethylene, polyethylene, and nylon. Especially, the protective layer is desirably those in which the film is easily formed by means of the vacuum film formation method based on the physical technique, because the recording layer of the optical recording medium is usually formed by means of the vacuum film formation method based on the physical technique such as sputtering. It is desirable that the protective layer transmits the laser beam without attenuation during recording and reproduction. Therefore, it is preferable to use a carbon film or a diamond-like carbon film having a small extinction coefficient.

The optical recording medium of the present invention is subjected to recording or reproduction by using the optical head which carries the solid immersion lens and utilizing the evanescent light which leaks out from the solid immersion lens. According to the present invention, the optical recording medium based on the use of the evanescent light is classified into the following two types of optical recording media depending on the transmitting path of the evanescent light. In the first type optical recording medium, the protective layer having the self-lubricating property, which satisfies the following conditional expression (1), is formed at the uppermost layer disposed on the side opposite to the substrate:

$$1 \leq n_0 \sin \theta < n \quad (1)$$

In this expression, $n_0$ represents a refractive index of the solid immersion lens, n represents a refractive index of the protective layer having the self-lubricating property, and $\theta$ represents an angle of incidence of light with respect to a light-emitting plane of the solid immersion lens. That is, as shown in FIGS. 2A and 2B, the light is totally reflected at the interface between the air layer and the light-emitting plane of the solid immersion lens, and the evanescent light leaks out from the light-emitting plane toward the air layer, by satisfying the relationship of $1 \leq n_0 \sin \theta$ defined in the foregoing conditional expression (1) when the light coming into the solid immersion lens forms the angle of incidence $\theta$ with respect to the light-emitting plane of the solid immersion lens. The evanescent light is transmitted through the air layer, and it arrives at the surface of the protective layer of the optical recording medium. Since the foregoing conditional expression (1) of $n_0 \sin \theta < n$ is satisfied, the evanescent light, which has arrived at the surface of the protective layer, behaves as ordinary light, and it is transmitted through the protective layer. Accordingly, it is appropriate that the flying amount (thickness of the air layer) is within the attenuation distance of the evanescent light regardless of the film thickness of the protective layer.

The second type optical recording medium is an optical recording medium characterized in that the protective layer having the self-lubricating property, which satisfies the following conditional expressions (2) and (3), is formed at the uppermost layer disposed on the side opposite to the substrate:

$$n \leq n_0 \sin \theta \quad (2)$$

$$t \leq (\lambda - 4h)/4n \quad (3)$$

In these expressions, $n_0$ represents a refractive index of the solid immersion lens, n represents a refractive index of the protective layer having the self-lubricating property, $\theta$ represents an angle of incidence of light with respect to a light-emitting plane of the solid immersion lens, $\lambda$ represents a wavelength of light radiated from a light source, and h represents a distance between the light-emitting plane of the solid immersion lens and the surface of the protective layer. The refractive index n of the protective layer having the self-lubricating property satisfies $1 \leq n$. Therefore, concerning the foregoing conditional expression (2), $1 \leq n_0 \sin \theta$ is satisfied. Accordingly, as shown in FIGS. 2A and 2B, the light is totally reflected at the interface between the air layer and the light-emitting plane of the solid immersion lens, and the evanescent light leaks out from the light-emitting plane toward the air layer, when the light coming into the solid immersion lens forms the angle of incidence $\theta$ with respect to the light-emitting plane of the solid immersion lens. The evanescent light is transmitted through the air layer, and it arrives at the surface of the protective layer of the optical recording medium. Since the foregoing conditional expression (2) of $n \leq n_0 \sin \theta$ is satisfied, the total reflection condition holds at the interface between the air layer and the surface of the protective layer. The evanescent light leaks out again from the interface between the air layer and the surface of the protective layer toward the protective layer. In order to transmit the evanescent light from the light-emitting plane of the solid immersion lens to the bottom surface of the protective layer, it is necessary that the optical path length therebetween (h+nt) is not more than ¼ of the wavelength of the evanescent light. Since the second type optical recording medium satisfies the foregoing conditional expression (3), the evanescent light is transmitted through the protective layer, and it arrives at the bottom surface of the protective layer. Subsequently, the evanescent light behaves as an ordinary light, and it arrives at the recording layer to record or reproduce information.

As described above, when information is recorded or reproduced by using the solid immersion lens and the evanescent light, it is possible to appropriately select the first type optical recording medium or the second type optical recording medium to be utilized, for example, depending on the refractive index of the solid immersion lens to be used and the material quality of the protective layer. For example, the super spherical solid immersion lens makes it possible to collect the light on the light-emitting plane at an angle larger than the angle of incidence of the light coming into the surface of the solid immersion lens, as compared with the hemispherical solid immersion lens. Accordingly, NA is further increased, and consequently the spot size is further decreased. Therefore, when the super spherical solid immersion lens is used, then minute recording marks can be formed, and they can be reproduced, as compared with the case in which the hemispherical solid immersion lens is used. Thus, the use of the super spherical solid immersion lens makes it possible to perform recording and reproduction at a higher density. However, the increase in angle of incidence $\theta$ makes it difficult to select the material for the solid protective layer which satisfies the foregoing conditional expression (1). Therefore, the second type optical recording medium is preferred as an optical recording medium to perform recording and reproduction at a high density by using the super spherical solid immersion lens.

In the optical recording medium of the present invention, if the refractive index of the protective layer having the self-lubricating property is greatly different from the refractive index of the dielectric layer contacting with the protective layer, then the laser beam is reflected by the interface between the both, and the laser beam is not utilized effectively. In order to suppress the reflection of the laser beam at the interface, it is desirable that an absolute value of difference between the refractive index of the protective layer and the refractive index of the dielectric layer is within 0.5. It is desirable that an absolute value of difference between an extinction coefficient of the protective layer and an extinction coefficient of the dielectric layer is within 0.2 in order to suppress attenuation of the laser beam.

In the optical recording medium of the present invention, a lubricant layer may be further formed on the protective layer having the self-lubricating property, by reason of further improvement in sliding performance. For example, a layer composed of a silicon lubricant may be formed in a film thickness of 1 nm to 5 nm.

When a carbon film is used as the protective layer having the self-lubricating property in the optical recording medium of the present invention, it is preferable that the hardness and the optical characteristics of the film may be controlled by allowing the carbon film to contain, for example, hydrogen, nitrogen, and fluorine. It is desirable that the protective layer having the self-lubricating property has a film thickness of not less than 5 nm and within 50 nm. If the thickness is less than 5 nm, it might be difficult to obtain sufficient sliding characteristics. There is no upper limit for the film thickness of the protective layer concerning the sliding characteristics. However, since a thick film may cause optical loss, it is desirable that the film thickness of the protective layer having the self-lubricating property has an upper limit of 50 nm.

Upon reproduction on the optical recording medium, the reproducing light, which is emitted from the optical system of the optical head, for example, from the objective lens such as the solid immersion lens, is collected on the recording layer. The light-transmissive medium such as air exists within the depth of focus of the optical system, i.e., between the light-emitting plane of the lens and the surface of the optical recording medium. If the thickness of the light-transmissive medium is within a coherent distance of the reproducing light beam, the interference of light occurs in some cases at the interfaces on both sides of the light-transmissive medium in accordance with the relationship between the thickness of the light-transmissive medium and the wavelength of the reproducing light beam. In the case of the conventional type optical recording medium in which the reproducing light beam comes into the side of the transparent substrate, no light-transmissive medium exists in the gap between the optical head and the substrate within the depth of focus of the optical system of the optical head. Therefore, no problem arises concerning the interference of light at the interface of the light-transmissive medium layer. On the other hand, when the flying type optical head is used to perform reproduction on the optical recording medium of the type in which the reproducing light beam comes into the side opposite to the substrate as in the first and second types of the optical recording media as described above, then the interference effect on the reproducing light beam is conspicuous between the optical element carried on the flying type optical head and the surface of the optical recording medium (at the both interfaces of the light-transmissive medium) depending on the variation in flying amount of the flying type optical head, and the reproduced signal intensity is varied. Therefore, in the present invention, it is desirable to satisfy the following condition in order to suppress any variation in reproduced signal intensity, which would be otherwise caused by the interference of light in the light-transmissive medium (air) existing between the optical recording medium and the optical head. That is, when a light beam having a wavelength of 650 to 700 nm is used as the recording or reproducing light beam, then a carbon layer or a diamond-like carbon having a film thickness of 5 nm to 30 nm may be used for the protective layer having the self-lubricating property, and a material having a refractive index of 1.9 to 2.2 and a film thickness of 80 nm to 120 nm may be used for the dielectric layer. A stable reproduced signal can be detected by using the flying type optical head under the condition as described above.

The optical recording medium of the present invention is directed to any one of optical recording media including, for example, read-only optical recording media such as CD, CD-ROM, and DVD-ROM in which information is reproduced depending on the presence or absence of concave-convex pits and holes and the difference in reflectance between the crystal phase and the amorphous phase; write-once type optical recording media such as CD-R in which recording is performed by making holes with a laser beam in an organic dye layer and an inorganic layer composed of Te compound or the like; magneto-optical recording media which comprise a recording layer of an alloy layer composed of a transition metal and a rare earth metal such as TbFeCo and DyFeCo; and rewritable optical recording media such as phase-change optical recording media in which a recording layer composed of a Ge alloy, an In alloy or the like can be reversibly changed between the crystal phase and the amorphous phase by means of irradiation with light.

The substrate used in the optical recording medium of the present invention is composed of a resin such as polycarbonate, polyolefine, polymethyl acrylate, polystyrene, and nylon. Besides, it is possible to use a disk substrate made of glass, silicon, thermally oxidized silicon, or a metal such as Al and Ti.

According to a second aspect of the present invention, there is provided an optical recording apparatus comprising an optical head, for recording or reproducing information on an optical recording medium, wherein:

the optical head comprises a flying type slider and a solid immersion lens installed to the flying type slider;

the optical recording medium comprises, on a substrate, at least a reflective layer, a recording layer, and a dielectric layer, a solid protective layer having a self-lubricating property is formed on the dielectric layer, and evanescent light is allowed to come into a side of the solid protective layer having the self-lubricating property by using the optical head so that at least one of recording and reproduction of information is performed on the optical recording medium; and the following expression is satisfied:

$$1 \leq n_0 \sin \theta < n$$

provided that $n_0$ represents a refractive index of the solid immersion lens, $\theta$ represents an angle of incidence of light with respect to a light-emitting plane of the solid immersion lens, and n represents a refractive index of the solid protective layer having the self-lubricating property.

In the optical recording apparatus according to the second aspect of the present invention, the refractive index $n_0$ of the solid immersion lens and the angle of incidence $\theta$ of light with respect to the light-emitting plane of the solid immersion lens are adjusted to satisfy the foregoing conditional expression (1). Accordingly, the optical recording apparatus makes it possible to appropriately perform recording or reproduction on the first type optical recording medium.

According to a third aspect of the present invention, there is provided an optical recording apparatus comprising an optical head, for recording or reproducing information on an optical recording medium, wherein:

the optical head comprises a flying type slider and a solid immersion lens installed to the flying type slider;

the optical recording medium comprises, on a substrate, at least a reflective layer, a recording layer, and a dielectric layer, a solid protective layer having a self-lubricating property is formed on the dielectric layer, and evanescent light is allowed to come into a side of the solid protective layer having the self-lubricating property by using the optical head so that at least one of recording and reproduction of information is performed on the optical recording medium; and the following expressions are satisfied:

$n \leq n_0 \sin \theta, \ t \leq (\lambda - 4h)/4n$ provided that no represents a refractive index of the solid immersion lens, θ represents an angle of incidence of light with respect to a light-emitting plane of the solid immersion lens, h represents a distance between the light-emitting plane of the solid immersion lens and a light-incoming surface of the solid protective layer having the self-lubricating property, λ represents a wavelength of light, n represents a refractive index of the solid protective layer having the self-lubricating property, and t represents a film thickness of the solid protective layer having the self-lubricating property.

In the optical recording apparatus according to the third aspect of the present invention, the refractive index $n_0$ of the solid immersion lens, the angle of incidence θ of light with respect to the light-emitting plane of the solid immersion lens, the wavelength λ of light, and the distance (flying height of the optical head) h between the light-emitting plane of the solid immersion lens and the light-incoming surface of the solid protective layer having the self-lubricating property are adjusted to satisfy the foregoing conditional expressions (2) and (3). Accordingly, the optical recording apparatus makes it possible to appropriately perform recording or reproduction on the second type optical recording medium.

In the optical recording apparatuses according to the second and third aspects of the present invention, it is preferable that the light, which is allowed to come into the solid immersion lens carried on the optical head, is linearly polarized in a direction parallel to a track of the optical recording medium. The light, which is polarized in the direction parallel to the track of the optical recording medium, has a long distance capable of evanescent transmission for the component of the obliquely incoming light in a direction of the track, as compared with the light polarized in a direction perpendicular to the track. Therefore, it is possible to increase the reproduced signal from minute marks recorded at a high density. This embodiment is especially preferred when reproduction is performed on a read-only optical recording medium and on a phase-change optical recording medium. In order to linearly polarize the light coming into the solid immersion lens in the direction parallel to the track of the optical recording medium, for example, it is possible to provide a polarizer in an optical path between the light source and the solid immersion lens, or it is possible to use a laser as a light source which emits a linearly polarized laser beam.

The optical recording apparatus of the present invention may be used as an apparatus for performing recording and reproduction on a magneto-optical recording medium. In this embodiment, the optical head comprises a magnetic field-applying means such as a magnetic coil.

In the optical recording apparatus of the present invention, the solid immersion lens may be a hemispherical solid immersion lens or a super spherical solid immersion lens.

In the present invention, a solid protective layer having a self-lubricating property may be formed on a surface of the flying type slider opposing to the optical recording medium. Accordingly, even if the flying position of the optical head is varied, and the optical head contacts with the surface of the optical recording medium, then the optical head smoothly glides on the surface of the recording medium. Accordingly, the optical head is not caught on the surface, and the sliding scratch hardly occurs on the surface of the optical recording medium or on the sliding surface of the optical head. The protective layer having the self-lubricating property tends to be peeled off in a layered manner. Therefore, even when the optical head intensely slides on the recording medium, the protective layer is firstly peeled off in the layered manner. Thus, the optical head and the optical recording medium surface are prevented from occurrence of sharp scratches. Therefore, it is possible to decrease the error and the defect of the reproduced signal which would be otherwise caused by the scratch formed on the optical head and on the surface of the optical recording medium on the side of being irradiated with the reproducing light beam.

The term "optical recording apparatus" herein means an apparatus which has at least one of functions to perform recording and reproduction by using light. The term has a concept including recording apparatuses for performing only recording, reproducing apparatuses for performing reproduction on read-only optical recording media such as CD-ROM, and apparatuses for performing recording and reproduction on rewritable media such as magneto-optical recording media.

BRIEF DESCRIPTION OF THE DRAWINGS

FIG. 3 shows a schematic cross-sectional view illustrating a structure of a slider type optical head used in a recording and reproducing system based on the use of a solid immersion lens and evanescent light.

FIG. 5 shows a schematic cross-sectional view illustrating a magneto-optical head produced in Example 2 of the present invention.

DESCRIPTION OF THE PREFERRED EMBODIMENTS

Embodiments and Examples of the optical recording medium and the optical recording apparatus of the present invention will be specifically explained in detail below with reference to the drawings.

EXAMPLE 1

Figure 4:
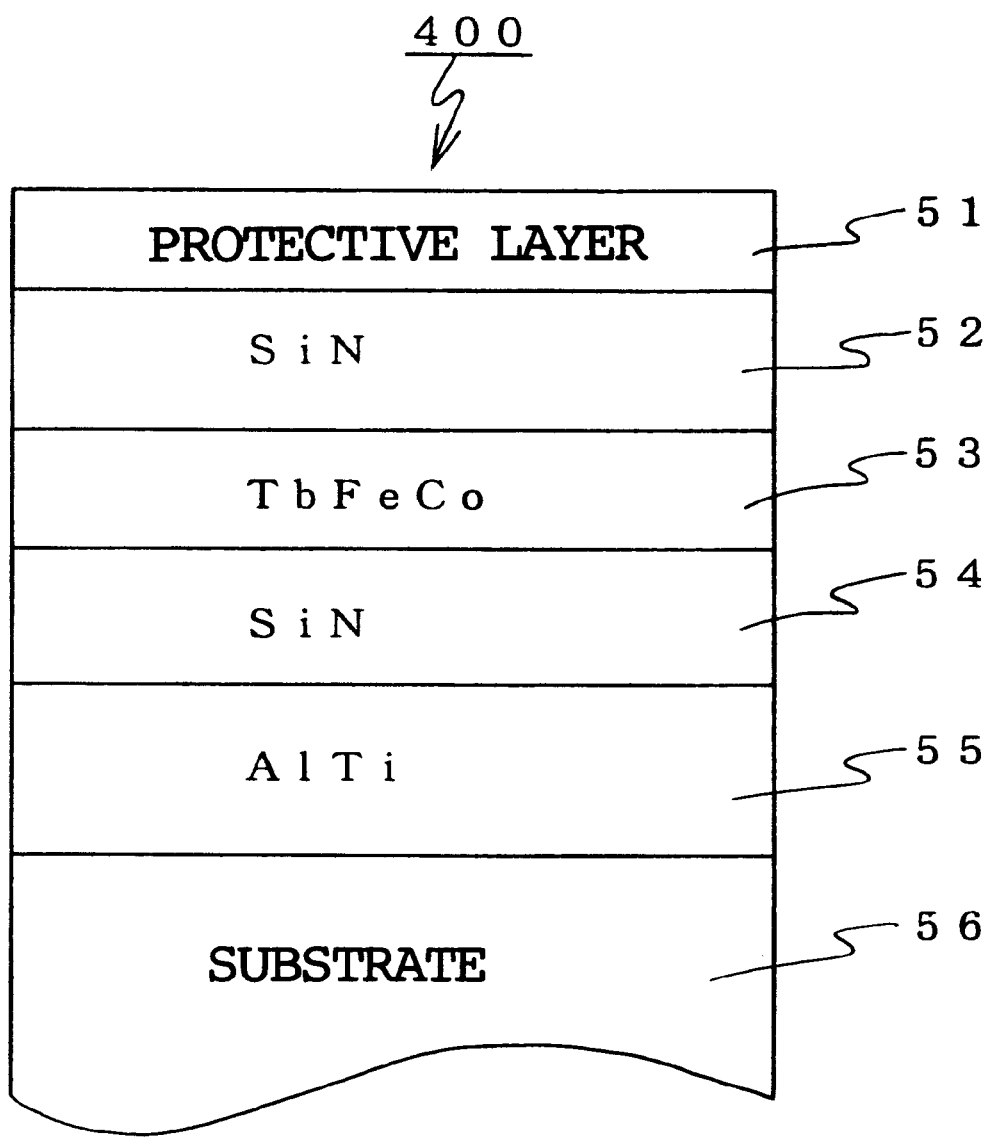
FIG. 4 shows a schematic cross-sectional view illustrating an embodiment of the optical recording medium of the present invention.

FIG. 4 shows a cross-sectional view illustrating a magneto-optical recording medium 400 depicting an embodiment of the optical recording medium of the present invention. The magneto-optical recording medium 400 having this structure was produced by means of the following method. At first, polycarbonate was subjected to injection molding by using an injection compression molding machine to produce a disk substrate 56 made of polycarbonate resin. The substrate 56 had a diameter of 95 mm, a thickness of 1.2 mm, and an internal diameter of 25 mm. Subsequently, an inline type DC magnetron sputtering apparatus was used to form, on the substrate 56, an AlTi alloy reflective layer 55 having a film thickness of 50 nm, a silicon nitride layer 54 (second dielectric layer) having a film thickness of 30 nm, a TbFeCo alloy layer 53 (recording layer) having a film thickness of 25 nm, and further a silicon nitride layer 52 (first dielectric layer) having a film thickness of 80 nm respectively. After that, the same magnetron sputtering apparatus was used to form a diamond-like carbon layer 51 having a film thickness of 20 nm as a protective layer having the self-lubricating property.

In the sputtering described above, the AlTi reflective layer 55 was formed by using an AlTi alloy target having a Ti content of 2 at %, and allowing Ar gas as a sputtering gas to flow at a flow rate of 80 sccm (degree of vacuum: 1.2 Pa) with an applying power of 2 kW. Each of the silicon nitride layers 54, 52 (first and second dielectric layers) was formed by using a silicon target and using Ar-$N_2$ mixed gas (mixing ratio: 1:1) at a flow rate of 80 sccm (degree of vacuum: 1.2 Pa) with an applying power of 2 kW. The TbFeCo alloy layer 52 was formed by using a $Tb_{23}Fe_{67}Co_{10}$ (at %) alloy target and allowing Ar gas to flow at a flow rate of 100 sccm (degree of vacuum: 1.5 Pa) under a condition of an applying power of 500 W. The diamond-like carbon layer 51 was formed by using an amorphous carbon target and allowing Ar-methane mixed gas (mixing ratio: 1:1) to flow at a gas flow rate of 300 sccm (degree of vacuum: 5 Pa) with an applying power of 2 kW. During this process, a negative bias voltage is also applied to the substrate side by applying the RF electric power of 200 W to the substrate side to perform the bias sputtering.

EXAMPLE 2

Figure 6A:
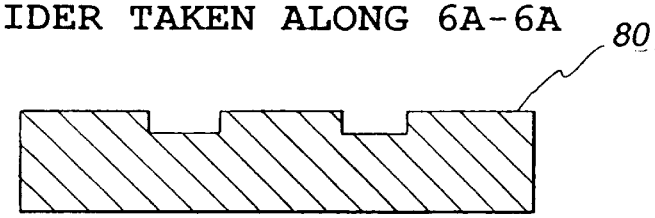
FIGS. 6A–C, hereinafter referred to as FIG. 6, show concave-convex patterns formed on the bottom surface of a slider of the optical head produced in Example 2.
Figures 6B, 6C:
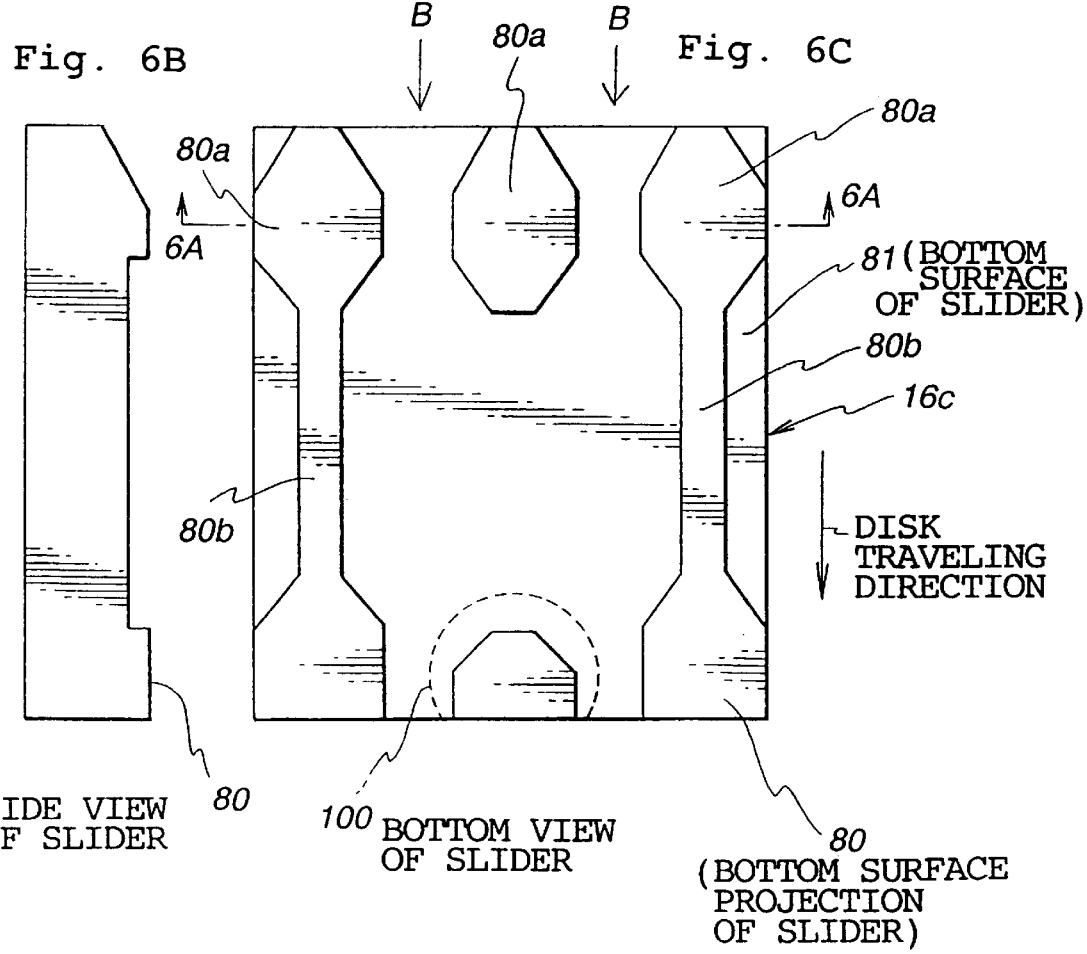

FIG. 5 shows a cross-sectional view illustrating main components of an optical head 500. The optical head 500 principally comprises a flying type slider 102, a solid immersion lens 100, and a magnetic coil 104. A protective layer 105 is formed on an opposing surface (sliding surface) of the flying type slider 102 opposing to the optical recording medium. The protective layer 105 suppresses sliding scratches which would otherwise occur on the surface of the magneto-optical recording medium and on the optical head when the optical head contacts with the surface of the optical recording medium. The optical head 500 can be produced by means of the following method. At first, in order to produce the flying type slider 102, an $Al_2O_3$-TiC composite ceramic wafer was prepared. A sliding surface having a convex-concave pattern as shown in FIG. 6 was formed on one. of the wafer surfaces. The pattern is formed by means of machining or etching.

After the pattern formation, unnecessary portions were cut to extract the slider 102 of the optical head. The protective layer 105 composed of diamond-like carbon was formed to have a thickness of 10 nm on the pattern formation surface by means of sputtering in the same manner as in the protective film formed on the magneto-optical recording medium. Subsequently, a hole to install the solid immersion lens 100 and the recording magnetic field-generating coil 104 was formed by means of machining or etching. The solid immersion lens 100 and the magnetic coil 104 were installed in the hole as shown in FIG. 5. In this embodiment, the solid immersion lens 100 was a super spherical solid immersion lens.

The pattern of the sliding surface shown in FIG. 6 is provided in order to control the air flow so that the flying characteristic of the optical head is stabilized. Various such patterns have been investigated. The pattern can be designed in conformity with the size and the flying amount of the optical head. In this embodiment, the slider 102 was designed to be a negative/positive pressure joint type slider. As understood from a bottom view, a left side view, and a cross-sectional view taken along a line 6A—6A of the slider 102 shown in FIG. 6, a bottom surface 81 of the slider 102 is formed with projections 80 slightly protruding from the bottom surface 81 (protruding in the front direction concerning the drawing plane in FIG. 6) and extending in the traveling direction of the disk (magneto-optical recording medium) as shown by an arrow in FIG. 6. The projection 80 is formed so that its width (length in the direction perpendicular to the disk traveling direction) is changed along the disk traveling direction. An air flow is generated when the disk (magneto-optical recording medium) is rotated with respect to the slider 102 by means of a turn table or the like. The air flow passes through a space between the projections 80 as shown by arrows B. During this process, the air flow is compressed in a narrow area interposed by wide-width portions 80a (on the line AA) of the projections 80. After that, the air flow diffuses into a wide-width area interposed by narrow-width portions 80b. Therefore, the pressure of the air flow is lowered. The lowered pressure (negative pressure) generates an attracting force which is exerted on the slider 102 from the disk. On the other hand, the flying force, which is generated by the rotation of the disk, acts on the slider 102. These forces balance with each other. Thus, the slider 102 can maintain a constant spacing distance between the slider 102 and the disk. Reference may be made for details of the negative/positive pressure joint type slider, for example, to the part concerning illustrative application to the magnetic disk described in "MR/GMR Head Technology", p. 112 (Trikepps Publishing).

Figure 7:
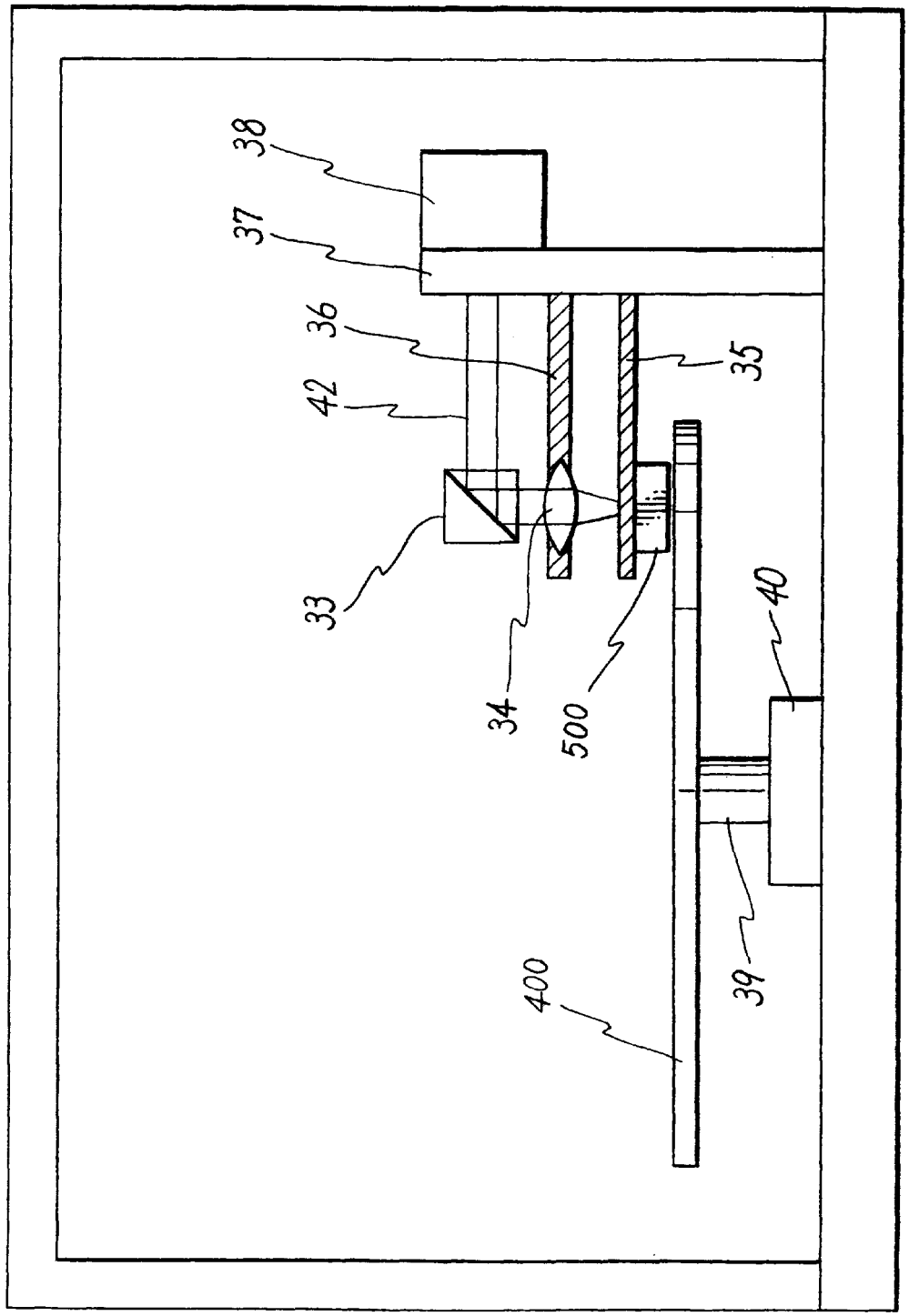
FIG. 7 shows a schematic structure of the optical recording apparatus of the present invention.
Figure 8:
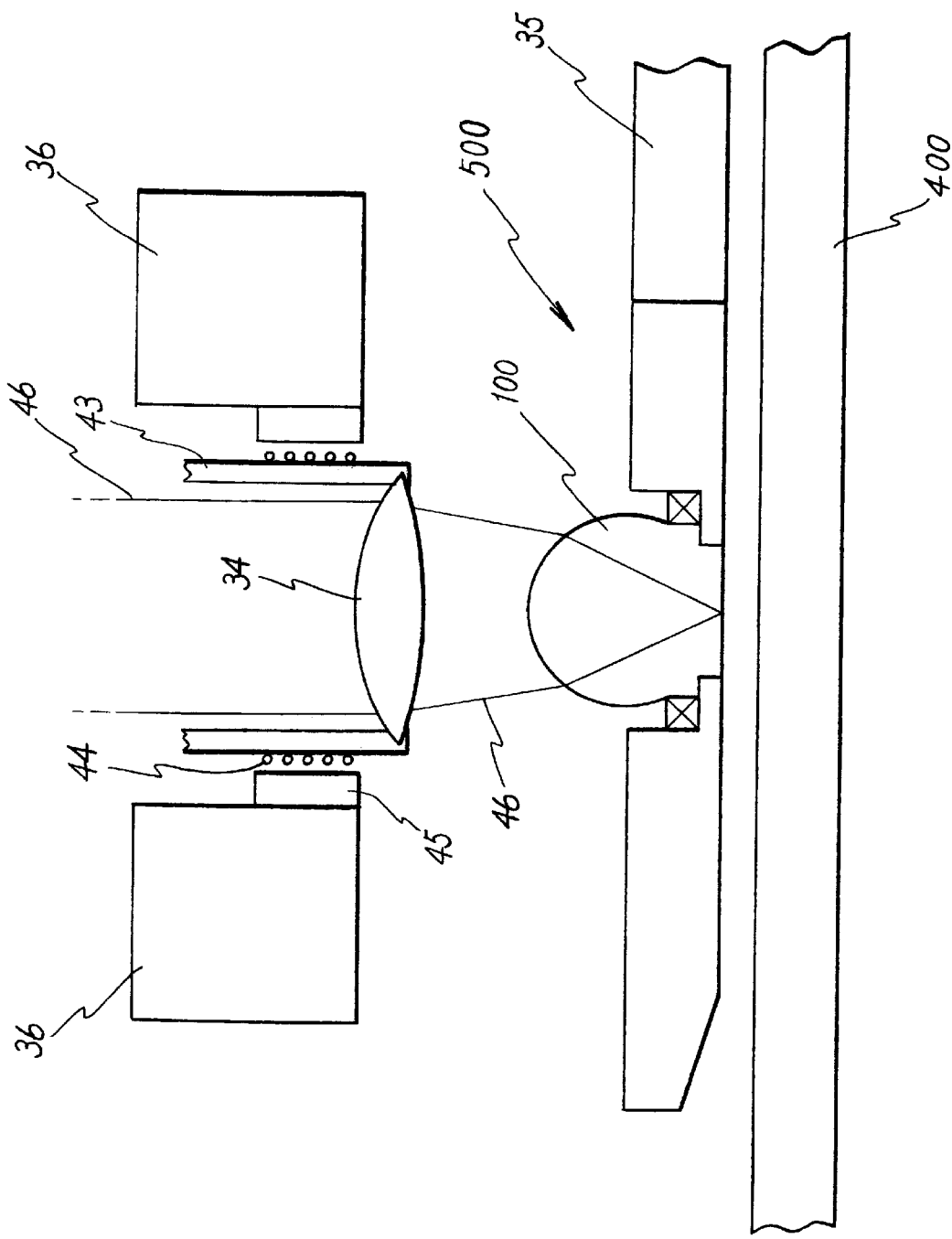
FIG. 8 shows a magnified view of a structure of an objective lens portion of the optical recording apparatus shown in FIG. 7.

The magneto-optical recording medium 400 and the optical head 500 produced in Example 1 and Example 2 are incorporated into an optical recording apparatus as shown in FIG. 7. The optical head 32 is incorporated into the tip of a swing arm 35 attached to a rotary actuator 37. An objective lens 34 for focusing the laser beam into the solid immersion lens in the optical head 500 is fixed on an arm 36 incorporated in the same rotary actuator 37 and mechanically fixed with the swing arm 35 to make movement therewith. Each of the swing arm 35 and the arm 36 may be constructed, for example, by a plate spring in the same manner as in the magnetic disk apparatus. As shown in FIG. 8, the objective lens 34 is provided with a driving mechanism (voice coil type actuator) based on the use of a coil 44 and a magnet 45 to maintain a constant spacing distance between the objective lens 34 and the solid immersion lens 100 so that the focal point is always formed on the bottom surface of the solid immersion lens 100. The focusing servo for allowing the laser beam 46 to always form the focal point on the bottom surface of the solid immersion lens may be constructed by using the same method as that for the focusing servo used to continuously and always focus the laser beam onto the optical disk surface in an ordinary optical storage apparatus. That is, a focus error signal may be generated with respect to the returning light beam from the solid immersion lens by means of, for example, the astigmatism method or the knife edge method, and the focusing servo may be applied on the basis of the obtained signal.

During recording or reproduction, the solid immersion lens 100 is separated by a predetermined spacing distance, i.e., 40 nm to 60 nm from the surface of the magneto-optical recording medium 400 to perform the recording or reproduction by using the evanescent light. For this purpose, the height position of the bottom surface (81) of the flying type slider 500 may be controlled. This control can be realized by designing or adjusting, for example, the pattern formed on the bottom surface of the flying type slider 500 (see FIG. 6), the number of rotation of the disk, and the angle (skew) formed by the disk and the slider so that the slider has the predetermined spacing distance (flying amount) with respect to the disk surface, in the same manner as in the magnetic disk apparatus.

Figure 9:
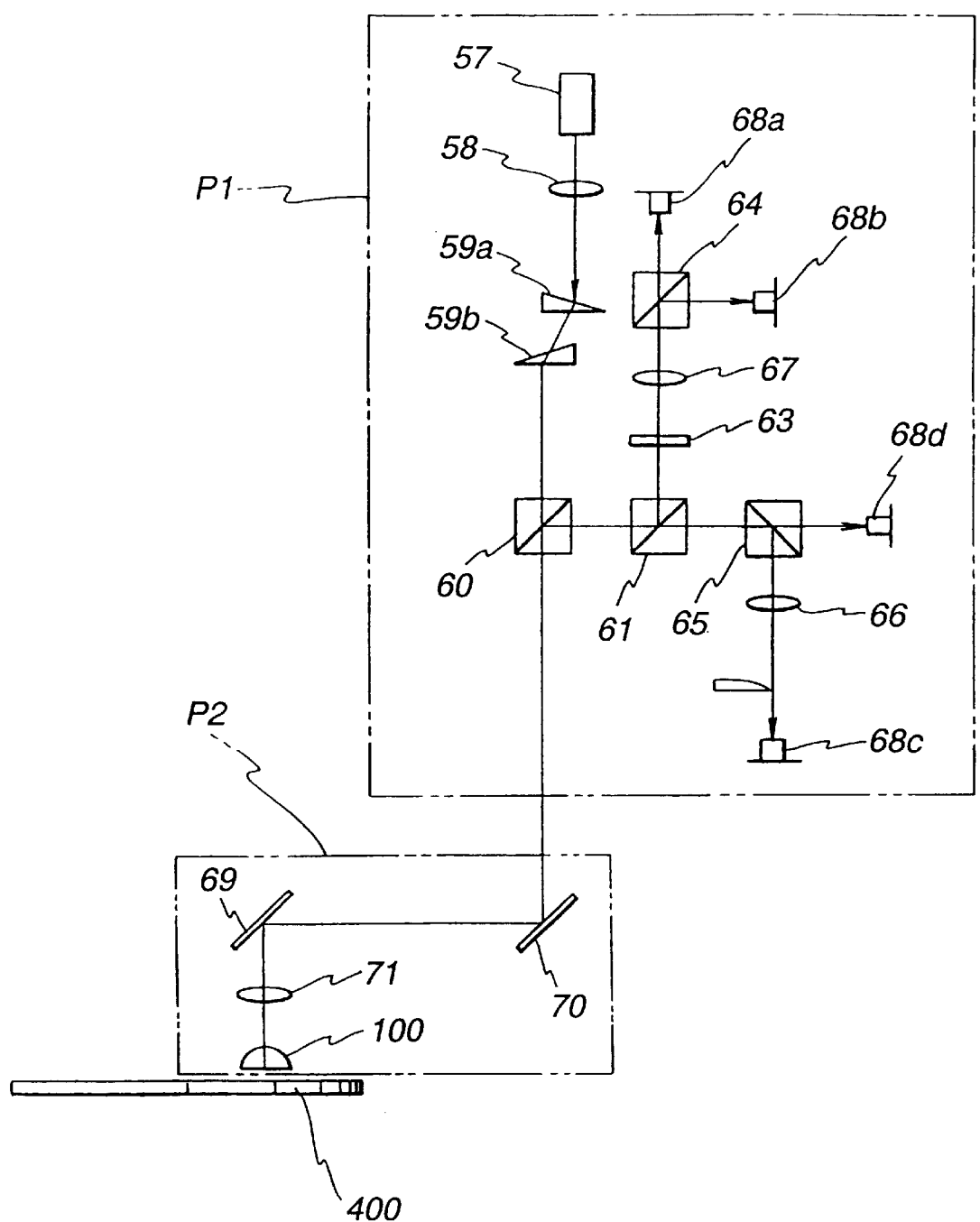
FIG. 9 illustrates an optical system used in the optical recording apparatus concerning the embodiment of the present invention.

FIG. 9 shows an embodiment of the entire optical system of the optical recording apparatus of the present invention. FIG. 9 shows the optical system to be used for the magneto-optical recording apparatus. An optical system, which is equivalent to those used for the recording and reproducing apparatus (drive) for performing recording and reproduction on an ordinary magneto-optical recording medium, can be used for a fixed optical system shown in FIG. 9. That is, a semiconductor laser having a wavelength of 680 nm is used as a laser light source 57. A laser beam, which is radiated from the laser light source, is linearly polarized in a direction parallel to the track of the optical recording medium. The laser beam, which is radiated from the laser light source 57, passes through a lens 58, prisms 59a, 59b, and a beam splitter 60. The laser beam is reflected by mirrors 70, 69, and then it comes into an objective lens 71. The laser beam is condensed by the solid immersion lens 100 to form the focal point on the bottom surface of the solid immersion lens 100. The light, which leaks from the bottom surface of the solid immersion lens 100, arrives at the recording layer of the magneto-optical recording medium 400 to form a magnetic mark corresponding to a recording signal. During the recording, a recording magnetic field is applied to the magneto-optical recording medium 400. The recording can be performed by means of any system of the optical modulation system, the magnetic field modulation system, and the optical magnetic field modulation system.

Upon reproduction, a reflected light beam from the magneto-optical recording medium 400 is reflected by the mirrors 69, 70, and then it is reflected by the beam splitter 60. The light beam is divided by a beam splitter 61 into light beams directed to two beam splitters 64, 65. The light beam coming into the beam splitter 65 is further divided thereby, and resultant beams come into a focusing-detecting detector 68c and a tracking signal-detecting detector 68d respectively. The reflected light beam, which passes through a half-wavelength plate 63 and a lens 67 to come into a beam splitter 64, comes into photodetectors 68a, 68b for detecting polarized light components which are perpendicular to one another so that a reproduction signal is detected.

When the phase-change system or the write-once system is used, it is possible to use an optical system equivalent to the drives for performing recording and reproduction on the phase-change magneto-optical recording medium and the write-once optical recording medium such as CD-R respectively. In the case of such an optical system, it is sufficient to use only one detector for detecting the signal, and it is unnecessary to provide the beam splitter 64 disposed immediately before the detector.

Comparative Example 1

A magneto-optical recording medium was produced in the same manner as in Example 1 except that the protective layer 51 was not formed on the silicon nitride film 52 in Example 1.

Comparative Example 2

An optical head was produced in the same manner as in Example 2 except that the protective layer 105 was not formed on the bottom surface of the flying type slider 102, i.e., on the surface opposing to the optical recording medium in Example 2.

[Measurement of Reproduction Error in Magneto-optical Signal]

The effect of the silicon nitride layer 52 (first dielectric layer) of the magneto-optical recording medium and the protective layer having the self-lubricating property formed on the bottom surface of the slider of the optical head was investigated in accordance with the following method. The magneto-optical recording medium and the optical head were incorporated into the optical recording apparatus described above in accordance with combinations shown in Table 1. The optical head was allowed to randomly seek 10,000 times between a radius of 25 mm and a radius of 45 mm. In Table 1, the magneto-optical recording medium produced in Example 1 is indicated by M1, and the optical head produced in Example 2 is indicated by H1 respectively. The magneto-optical recording medium produced in Comparative Example 1 is indicated by M2, and the optical head produced in Comparative Example 2 is indicated by H2 respectively. A pattern for the address signal for performing positioning with the optical head to be used and a pattern for the sample servo for performing tracking servo had been previously written at a track pitch of 0.8 µm with a shortest mark length of 0.4 µm on the optical recording medium by using a laser length-measuring instrument and a formatter in combination. The number of rotation of the magneto-optical recording medium was 4500 rpm. Under this condition, the flying amount of the optical head was 50 nm from the surface of the magneto-optical recording medium.

TABLE 1

|  | Optical recording medium | Optical head |
|---|---|---|
| Example 3 | M1 | H1 |
| Example 4 | M1 | H2 |
| Example 5 | M2 | H1 |
| Example 6 | M2 | H2 |

The number of defects was measured before and after 100,000 times of random seeks of the optical head for the respective combinations of the optical head and the medium. The defect was measured as follows. That is, a relatively long pattern having a mark length of 1 μm was written on all tracks (12500 tracks) between a radius of 30 mm and a radius of 40 mm. A portion, in which the amplitude was not more than 65% (error signal) as measured by using the magneto-optical signal upon reproduction, was regarded as the defect. In order to avoid that dust from the surrounding environment during the measurement would adhere to the medium to cause the defect, the measurement was performed in a measurement room of a degree of cleanness of 100. Further, the measurement for the defect was performed while covering the optical recording apparatus itself used for the measurement with a clean booth.

TABLE 2

|  | Number of defects | | Defect |
|---|---|---|---|
|  | Before random seek | After random seek | increment ratio |
| Example 3 | 1250 | 1500 | 1.20 |
| Example 4 | 1400 | 1850 | 1.32 |
| Example 5 | 1150 | 1780 | 1.54 |
| Example 6 | 1250 | 3240 | 2.59 |

The defect increment ratio referred to in Table 2 was determined in accordance with the following expression: defect increment ratio=(number of defects after random seek)/(number of defects before random seek). As understood from Table 2, the defect increment ratio is highest in the combination of the magneto-optical recording medium and the optical head not provided with the protective layer. The surface portion on the side of being irradiated with light, of the magneto-optical recording medium corresponding to the portion of occurrence of the defect was investigated by using an optical microscope and a scanning type electron microscope (SEM). As a result, a grazed trace was observed in a width of several μm to several tens μm at not less than 90% of the defect portions. The scratch, which was formed when the recording and reproduction were performed with the combination of the optical head and the magneto-optical recording medium of Example 6, was sharpest and keenest. The sliding surface of the optical head was observed with an optical microscope after 100,000 times of seek. As a result, an extremely large number of scratches were observed for the optical head used in Example 6. On the contrary, few scratches were observed in other Examples 3, 4, and 5.

According to the results described above, the following fact is appreciated. That is, it is possible to suppress the occurrence of scratches formed by irregular sliding movement between the head and the magneto-optical recording medium caused by variation of posture of the head associated with the movement of the optical head during the seek, and it is possible to decrease the defect associated with the occurrence of scratches, by providing the protective layer such as carbon having the self-lubricating property on the magneto-optical recording medium and the surface of the optical head opposing to the magneto-optical recording medium.

EXAMPLE 7

A magneto-optical recording medium of the first type of the present invention based on the use of the evanescent light, i.e. a magneto-optical recording medium for recording or reproducing information without transmitting the evanescent light into the protective layer having the self-lubricating property was produced. The magneto-optical recording medium was produced in the same manner as in Example 1 except that a carbon film having a refractive index n=1.8 was formed as a film to have a film thickness of 10 nm as the protective layer having the self-lubricating property, and a silicon lubricant was formed as a film to have a film thickness of 2 nm as the lubricant layer on the protective layer.

Figure 1:
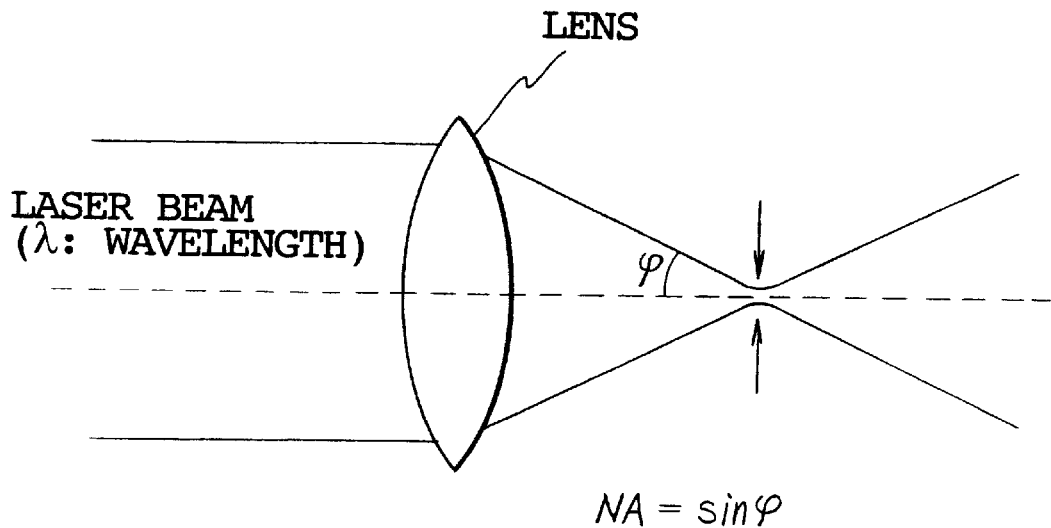
FIG. 1 illustrates a situation of a laser beam focused by a lens.
Figures 2A, 2B:
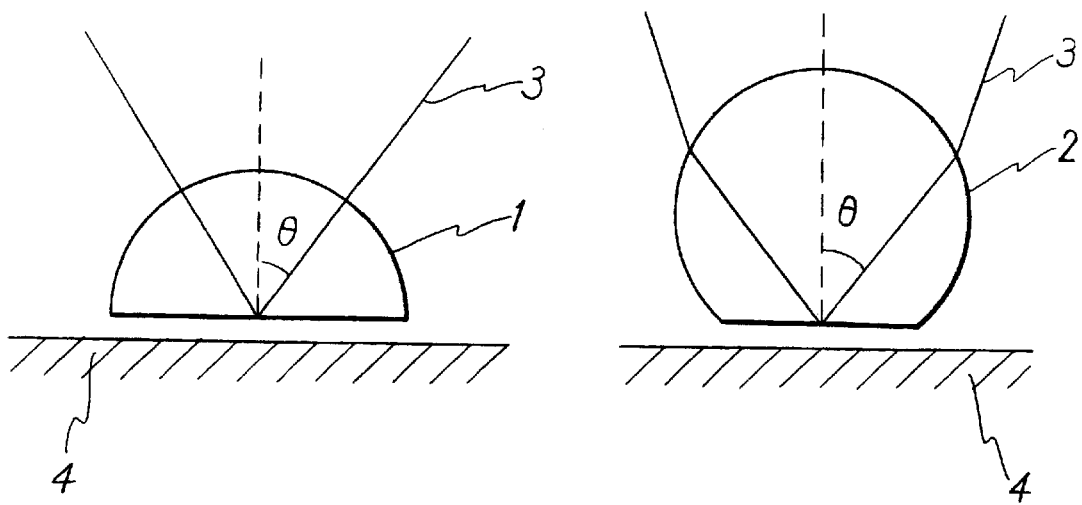
FIG. 2A illustrates an optical path obtained when a hemispherical solid immersion lens is used.
FIG. 2B illustrates an optical path obtained when a super spherical solid immersion lens is used.

A magneto-optical recording apparatus, in which the super spherical solid immersion lens 100 of the magneto-optical recording apparatus used in Example 2 is replaced with a hemispherical solid immersion lens 1 as shown in FIG. 2A, is preferred as the magneto-optical recording apparatus for recording or reproducing information on the magneto-optical recording medium produced in Example 7. The hemispherical solid immersion lens 1 may be made of, for example, flint glass having a diameter of 1 mm and a refractive index $n_0$ of 1.9. A laser beam having a wavelength of 680 nm may be used as the recording or reproducing light beam. The laser beam may be allowed to come into the bottom surface of the solid immersion lens at an angle of incidence of about 53°. On this condition, the evanescent light, which has leaked out from the bottom surface of the solid immersion lens, arrives at the protective layer having the self-lubricating property. However, the refractive index of the protective layer having the self-lubricating property is 1.8 which is larger than $n_0 \sin 53° = 1.5$. That is, the conditional expression (1) described above is satisfied. Therefore, the evanescent light is transmitted as ordinary light in the protective layer, and it is transmitted through the first dielectric layer to arrive at the recording layer. In this embodiment, the spot size based on the evanescent light is reduced to be $1/1.9$ as compared with a case in which an ordinary objective lens is used. Accordingly, it is possible to perform reproduction by using minute magnetic marks.

EXAMPLE 8

A magneto-optical recording medium of the second type of the present invention based on the use of the evanescent light, i.e. a magneto-optical recording medium for recording or reproducing information by transmitting the evanescent light through the protective layer having the self-lubricating property was produced. The magneto-optical recording medium was produced in the same manner as in Example 1 except that a carbon film having a refractive index n=1.5 was formed as a film to have a film thickness of 10 nm as the protective layer having the self-lubricating property, and a silicon lubricant was formed as a film to have a film thickness of 2 nm as the lubricant layer on the protective layer.

In Example 8, the magneto-optical recording apparatus described in Example 2 may be used to record or reproduce information on the magneto-optical recording medium. The solid immersion lens used in the magneto-optical recording apparatus is a super spherical solid immersion lens as shown in FIG. 2B. The solid immersion lens is formed by cutting a part of a sphere having a diameter r=1 mm, made of flint glass having a refractive index of 1.9. The cut surface of the solid immersion lens 2, i.e., the light-emitting surface of the solid immersion lens is obtained by cutting in a direction perpendicular to the optical axis of the incoming light beam. The cut position is at a distance of about 0.26 mm from the center of the sphere. In order to record information on the magneto-optical recording medium, a laser beam having a wavelength of 680 nm is allowed to come into the lens to form an angle of incidence of about 65° with respect to the light-emitting plane of the solid immersion lens. The spacing distance (flying height) between the light-emitting plane of the solid immersion lens and the surface of the uppermost layer of the magneto-optical recording medium is 100 nm. On this condition, the evanescent light, which has leaked out from the bottom surface of the solid immersion lens, arrives at the protective layer having the self-lubricating property. The refractive index n of the protective layer having the self-lubricating property is 1.5 which is smaller than $n_0 \sin 65° = 1.7$. Therefore, the conditional expression (2) described above is satisfied. The evanescent light is transmitted through the protective layer, and it arrives at the first dielectric layer. The refractive index of the first dielectric layer is usually about 2.0. Accordingly, the total reflection condition is not satisfied, and the light behaves as ordinary light which is transmitted through the first dielectric layer to arrive at the recording layer. In this embodiment, since the super spherical solid immersion lens is used, the spot diameter obtained on the recording medium may be allowed to have a size which is $1/3.61$ times the minimum spot diameter obtained in air. Accordingly, for example, it is possible to perform reproduction with high C/N from a magnetic mark having a mark length of 0.2 $\mu$m and a track pitch of 0.4 $\mu$m recorded on the magneto-optical recording medium in accordance with the magnetic field modulation writing using light pulse.

EXAMPLE 9

In Example 9, three kinds of magneto-optical recording media having different film thicknesses of the dielectric layers were produced to investigate the relationship between the flying amount of the optical head and the reproduced signal intensity for each of the magneto-optical recording media.

[Production of Magneto-optical Recording Medium]

Figure 10:
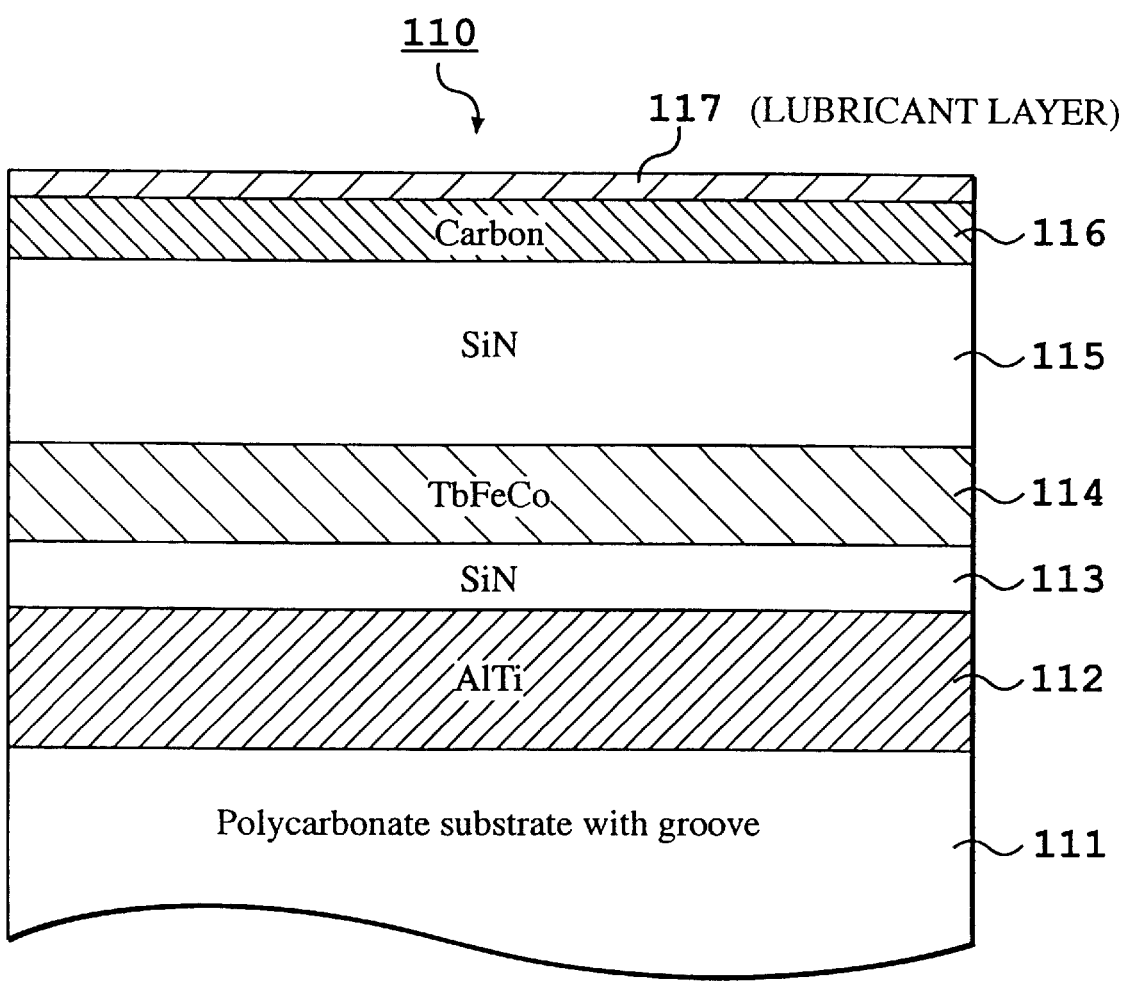
FIG. 10 shows a cross-sectional structure of a magneto-optical recording medium produced in Example 9 of the present invention.

Explanation will be made below for the method for producing the magneto-optical recording medium 110 according to the present invention as shown in FIG. 10. A polycarbonate substrate 111, on which a preformat pattern comprising, for example, clock pits, address pits, and tracking grooves were formed, was produced by means of injection molding. The polycarbonate substrate 111 had an outer diameter of 130 mm, an inner diameter of 15 mm, and a thickness of 1.2 mm. Subsequently, a continuous sputtering apparatus was used to successively form, on the polycarbonate substrate 111, films of a reflective layer 112 composed of AlTi alloy, a second dielectric layer 113 composed of silicon nitride, a magneto-optical recording layer 114 composed of TbFeCo, a first dielectric layer 115 composed of silicon nitride, and a protective layer 116 composed of diamond-like carbon by means of sputtering. The respective layers had the following thicknesses: protective layer 112: 50 nm, the second dielectric layer 113: 20 nm, the magneto-optical recording layer 114: 25 nm, the first dielectric layer 115: 100 nm, and the diamond-like carbon protective layer 116: 10 nm.

TbFeCo for constructing the recording layer 114 had a Curie temperature of 230° C. The carbon protective layer 116 had a refractive index of 1.6. Both of the first dielectric layer 115 and the second dielectric layer 113 had a refractive index of 2.05.

A lubricant layer 117 composed of a silicon compound was applied by spin coating to have a thickness of not more than 2 nm on the diamond-like carbon protective layer 116 as the uppermost layer of the stacked product obtained by the sputtering to produce the magneto-optical recording medium 110 having a stacked structure as shown in FIG. 10. The magneto-optical recording medium thus obtained was designated as film A.

Subsequently, magneto-optical recording media were produced in the same manner as described above respectively except that the film thickness of the first dielectric layer 115 was changed to 80 nm and 60 nm respectively. The obtained magneto-optical recording media were designated as film B and film C respectively.

Subsequently, the same optical recording apparatus as the optical recording apparatus used in Example 2 was used to record a test signal on the magneto-optical recording media of film A, film B, and film C respectively. After that, in order to measure the change in reproduced signal intensity with respect to the flying amount of the solid immersion lens over the magneto-optical recording medium, the optical recording apparatus shown in FIG. 7 was modified as follows. The slider of the optical head 500 was removed from the plate spring support mechanism, and it was installed to an actuator (not shown) capable of adjusting the height from the surface of the magneto-optical recording medium by means of a piezoelectric element. The actuator was arranged to arbitrarily adjust the spacing distance (thickness of the air layer) between the surface of the magneto-optical recording medium and the light-emitting plane of the solid immersion lens carried on the magneto-optical head 500, by inputting an operation signal from an external unit. The optical head 500 was arranged over the recording area of the magneto-optical recording medium. The reproducing light beam was radiated while variously adjusting the spacing distance between the light-emitting plane of the solid immersion lens and the surface of the magneto-optical recording medium to be 0 to 200 nm so that the reproduced signal intensity was measured at the respective spacing distances. During this procedure, the magneto-optical recording medium was not rotated, the relative position was fixed in the track direction and the radial direction with respect to the reproducing light beam, and only the spacing distance between the solid immersion lens and the surface was adjusted by using the piezoelectric element. The reproducing light beam had a wavelength $\lambda$ of $\lambda = 680$ nm.

Figure 11:
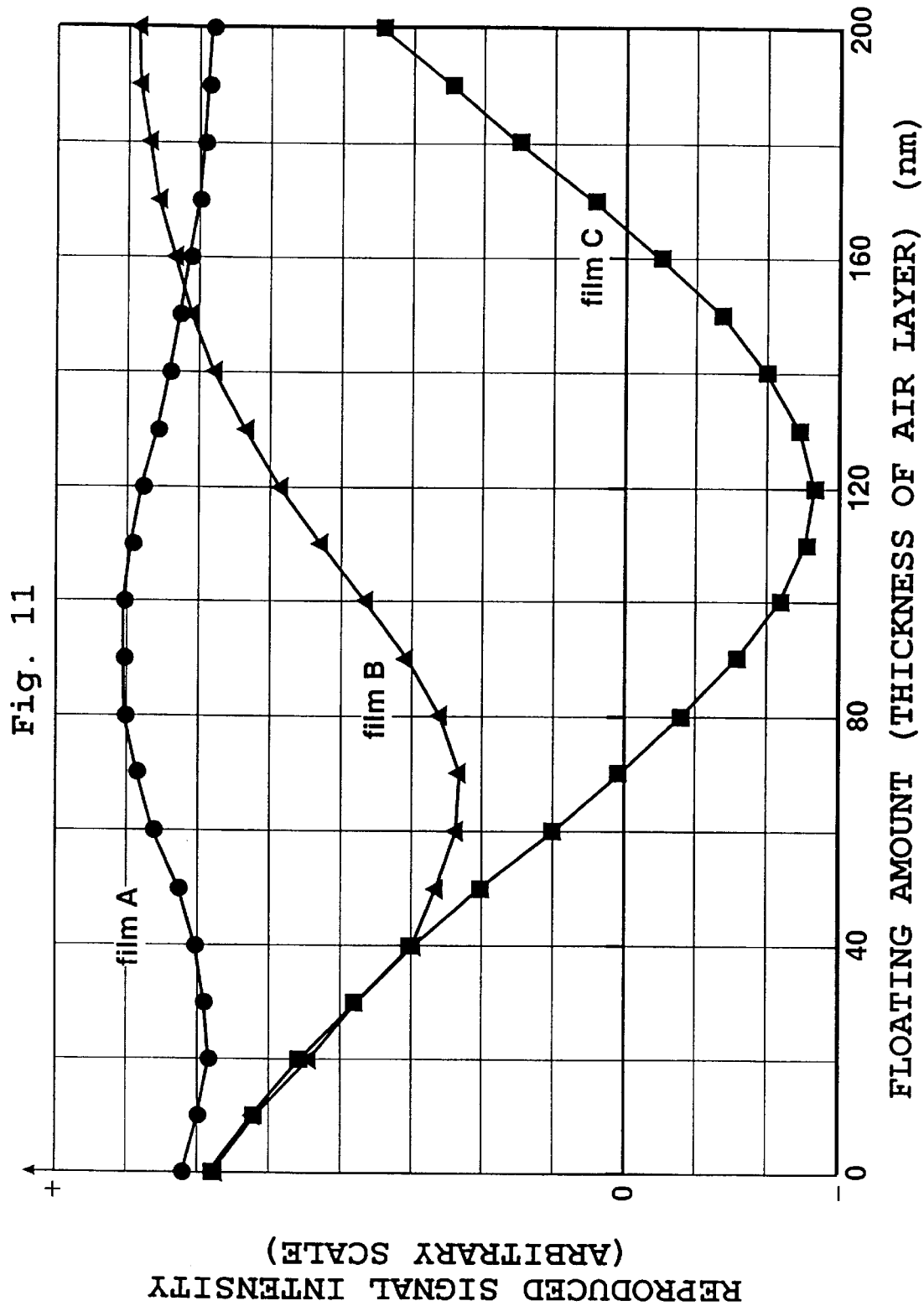
FIG. 11 shows a graph illustrating the change in reproduced signal intensity with respect to the spacing distance (corresponding to the flying amount of a magneto-optical head) between the surface of each of the magneto-optical recording media produced in Example 9 and the light-emitting plane of the solid immersion lens.

Results of the measurement is shown in a graph in FIG. 11. The horizontal axis in FIG. 11 indicates the spacing distance between the light-emitting plane of the solid immersion lens and the surface of the magneto-optical recording medium. Since the spacing distance corresponds to the flying amount of the flying type optical head, it is depicted as the flying amount. As understood from the graph shown in FIG. 11, the magneto-optical recording media of film A and film B suffer from less variation in reproduced signal intensity due to the variation in flying amount of the flying type optical head, as compared with the magneto-optical recording medium of film C. This is probably because of the following reason. That is, the influence, which is caused by the multiple interference effect of the reproducing light at the both interfaces of the air layer intervening between the light-emitting surface of the solid immersion lens and the surface of the magneto-optical recording medium, is suppressed in the magneto-optical recording media of film A and film B by adjusting the film thickness of the first dielectric layer.

The optical recording medium and the optical recording apparatus according to the present invention have been specifically explained above as exemplified by the case in which the magneto-optical recording medium is subjected to recording and reproduction. However, the optical recording medium of the present invention is not limited to the magneto-optical recording medium. The optical recording medium of the present invention may be an arbitrary optical recording medium such as the phase-change optical recording medium, the write-once type optical recording medium having the organic dye in the recording layer, and the read-only optical recording medium. An ordinary optical recording medium has a structure in which a recording layer is provided directly on a substrate or with a protective layer or the like interposed therebetween, for being irradiated with a recording or reproducing light beam from the side of the substrate. However, in the optical recording medium according to the present invention, the solid protective layer having the self-lubricating property is formed at the uppermost layer disposed on the side opposite to the substrate, and the recording or reproducing light beam is radiated from the side of the solid protective layer.

The specified embodiments of the first and second types of the magneto-optical recording media based on the use of the evanescent light have been explained in Examples 7 and 8. However, for example, the material and the thickness of the protective layer having the self-lubricating property may be variously changed within the ranges to satisfy the conditional expressions (1) or (2) and (3). It is also possible to change the layer structure of the magneto-optical recording medium. The first dielectric layer may be omitted. For example, a magnetic layer and/or a non-magnetic layer may be provided between the respective layers. For example, a magnetic layer such as a reproducing layer and an intermediate layer and/or an auxiliary layer such as a non-magnetic layer may be appropriately added in order to use the magneto-optical recording medium according to each of the embodiments as a magneto-optical recording medium for the magnetically induced super resolution-based reproduction or for the magnetically induced magnification-based reproduction.

In the embodiments described above, the optical head has been explained as exemplified by the optical head for performing recording and reproduction on the magneto-optical recording medium. However, the structure of the optical head is not limited to the structure shown in the drawings, for which it is possible to adopt various structures. For example, when recording or reproduction is performed on the phase-change optical recording medium, the write-once type optical recording medium containing a dye in the recording layer, and the read-only optical recording medium, it is unnecessary to provide the magnetic coil as the magnetic field-applying means.

In the optical recording medium of the present invention, the film thickness and the material quality of the protective layer having the self-lubricating property are appropriately adjusted in accordance with the conditions based on, for example, the refractive index of the solid immersion lens, and the angle of incidence and the wavelength of the laser beam. Accordingly, it is possible to reliably record and reproduce information by utilizing the evanescent light. Therefore, the optical recording medium of the present invention makes it possible to perform super high density recording and reproduction thereof by performing recording and reproduction by using the solid immersion lens.

In the optical recording medium of the present invention, the thickness and the refractive index of the solid protective layer having the self-lubricating property and the dielectric layer are adjusted to be in the predetermined ranges. Accordingly, even when the magneto-optical recording medium is subjected to reproduction by using the flying type optical head, it is possible to remarkably suppress the variation in reproduced signal intensity which would be otherwise caused by the variation in flying amount of the optical head which appears as the multiple interference effect of light. Therefore, the optical recording medium of the present invention ensures appropriate reproduction of high density recording information even when the flying type optical head installed with an optical element having large NA is used in order to perform high density recording and reproduction thereof.

In the present invention, it is possible to suppress the occurrence of scratches formed by irregular sliding movement between the head and the medium due to variation in posture of the head associated with the movement during the seek performed by the optical head, and it is possible to decrease the reproduction error associated with the occurrence of scratches, by providing the protective layer having the self-lubricating property such as carbon at least on one of the optical recording medium and the surface of the optical head opposing to the optical recording medium. Therefore, the optical recording apparatus of the present invention is preferably used for performing high density recording and reproduction on the optical recording medium.

We claim:

1. An optical recording apparatus comprising an optical head, for recording or reproducing information on an optical recording medium, wherein:

the optical head comprises a flying type slider and a solid immersion lens installed to the flying type slider;

the optical recording medium comprises, on a substrate, at least a reflective layer, a recording layer and a dielectric layer, a solid protective layer having a self-lubricating property is formed on the dielectric layer, and evanescent light is allowed to come into a side of the solid protective layer having the self-lubricating property by using the optical head so that at least one of recording and reproduction of information is performed on the optical recording medium; and the following expression is satisfied:

$$1 \leq n_0 \sin \theta < n$$

provided that $n_0$ represents a refractive index of the solid immersion lens, $\theta$ represents an angle of incidence of light with respect to a light-emitting plane of the solid immersion lens, and n represents a refractive index of the solid protective layer having the self-lubricating property.

2. The optical recording apparatus according to claim 1, wherein the light coming into the solid immersion lens is linearly polarized light which is polarized in a direction parallel to a track of the optical recording medium.

3. The optical recording apparatus according to claim 2, further comprising a light source, wherein the light source radiates, onto the optical recording medium, the linearly polarized light which is polarized in the direction parallel to the track of the optical recording medium.

4. The optical recording apparatus according to claim 1, wherein the optical head comprises a magnetic field-applying means to make it possible to perform recording and reproduction on a magneto-optical recording medium.

5. The optical recording apparatus according to claim 1, wherein the solid immersion lens is a hemispherical solid immersion lens or a super spherical solid immersion lens.

6. The optical recording apparatus according to claim 5, wherein a solid protective layer having a self-lubricating property is formed on a surface of the flying type slider opposing to the optical recording medium.

7. The optical recording apparatus according to claim 6, wherein the light coming into the solid immersion lens is linearly polarized light which is polarized in a direction parallel to a track of the optical recording medium.

8. The optical recording apparatus according to claim 6, wherein the optical head comprises a magnetic field-applying means to make it possible to perform recording and reproduction on a magneto-optical recording medium.

9. The optical recording apparatus according to claim 6, wherein the solid immersion lens is a hemispherical solid immersion lens or a super spherical solid immersion lens.

10. The optical recording apparatus according to claim 9, wherein a solid protective layer having a self-lubricating property is formed on a surface of the flying type slider opposing to the optical recording medium.

* * * * *